(12) United States Patent
Gonzalez Dominguez

(10) Patent No.: US 11,465,066 B2
(45) Date of Patent: Oct. 11, 2022

(54) INSTALLATION AND METHOD FOR PURIFYING FLUIDS BY DISTILLATION

(71) Applicant: INDICUM LIFE, S.L., El Puerto de Santa Maria (ES)

(72) Inventor: Pedro Gonzalez Dominguez, Alcala de Guadaira (ES)

(73) Assignee: INDICUM LIFE, S.L., El Puerto de Santa Maria Cadiz (ES)

( * ) Notice: Subject to any disclaimer, the term of this patent is extended or adjusted under 35 U.S.C. 154(b) by 0 days.

(21) Appl. No.: 15/021,943

(22) PCT Filed: Nov. 26, 2014

(86) PCT No.: PCT/ES2014/070867
§ 371 (c)(1),
(2) Date: Mar. 15, 2016

(87) PCT Pub. No.: WO2015/110674
PCT Pub. Date: Jul. 30, 2015

(65) Prior Publication Data
US 2016/0317944 A1    Nov. 3, 2016

(30) Foreign Application Priority Data
Jan. 24, 2014 (ES) .................................. 201430077

(51) Int. Cl.
*B01D 1/20* (2006.01)
*B01D 1/18* (2006.01)
(Continued)

(52) U.S. Cl.
CPC ............. *B01D 1/20* (2013.01); *B01D 1/0088* (2013.01); *B01D 1/16* (2013.01); *B01D 1/18* (2013.01); *B01D 1/26* (2013.01); *B01D 1/28* (2013.01); *B01D 1/30* (2013.01); *B01D 3/10* (2013.01); *B01D 3/105* (2013.01); *B01D 5/006* (2013.01);
(Continued)

(58) Field of Classification Search
CPC ... B01D 1/18; B01D 1/20; B01D 1/30; B01D 5/006; C02F 1/001; C02F 1/048; Y02W 10/33; Y02W 10/37
See application file for complete search history.

(56) References Cited

U.S. PATENT DOCUMENTS 5,441,606 A * 8/1995 Schlesinger ......... B01D 1/0017
202/176
2014/0305877 A1* 10/2014 Cioanta .................... C09K 8/58
134/1

FOREIGN PATENT DOCUMENTS

WO    WO 2012/032355 A1 *  3/2012 ................ C02F 1/04

\* cited by examiner

*Primary Examiner* — Brian A McCaig
(74) *Attorney, Agent, or Firm* — Lucas & Mercanti, LLP

(57) ABSTRACT

Method and plant for fluid purification by distillation comprising a reservoir (1) with a fluid containing diluted solids provided with an impurities filter on its outlet (2); a pump (3) connected to the reservoir outlet (1) and set up to increase the fluid containing solids pressure and temperature; and a heat area (4) for the fluid containing solids comprising a plurality of ducts contacting with a heat transfer fluid; and, furthermore, comprising a convergent-divergent nozzle (5) connected to the heat area outlet (4) and set to increase the biphasic liquid-vapor fluid speed so the diluted solids contained in the fluid already heated settle in a solids reservoir (6), whereas the fluid passes to a condenser (7) and then to a purified fluid reservoir (8) already in liquid state.

4 Claims, 1 Drawing Sheet

(51) Int. Cl.
*C02F 1/04* (2006.01)
*B01D 5/00* (2006.01)
*B01D 3/10* (2006.01)
*B01D 1/26* (2006.01)
*B01D 1/00* (2006.01)
*B01D 1/28* (2006.01)
*B01D 1/16* (2006.01)
*B01D 1/30* (2006.01)
*C02F 1/00* (2006.01)
*C02F 103/08* (2006.01)

(52) U.S. Cl.
CPC ............... *C02F 1/04* (2013.01); *C02F 1/048* (2013.01); *C02F 1/001* (2013.01); *C02F 2103/08* (2013.01); *Y02A 20/124* (2018.01); *Y02W 10/33* (2015.05); *Y02W 10/37* (2015.05)

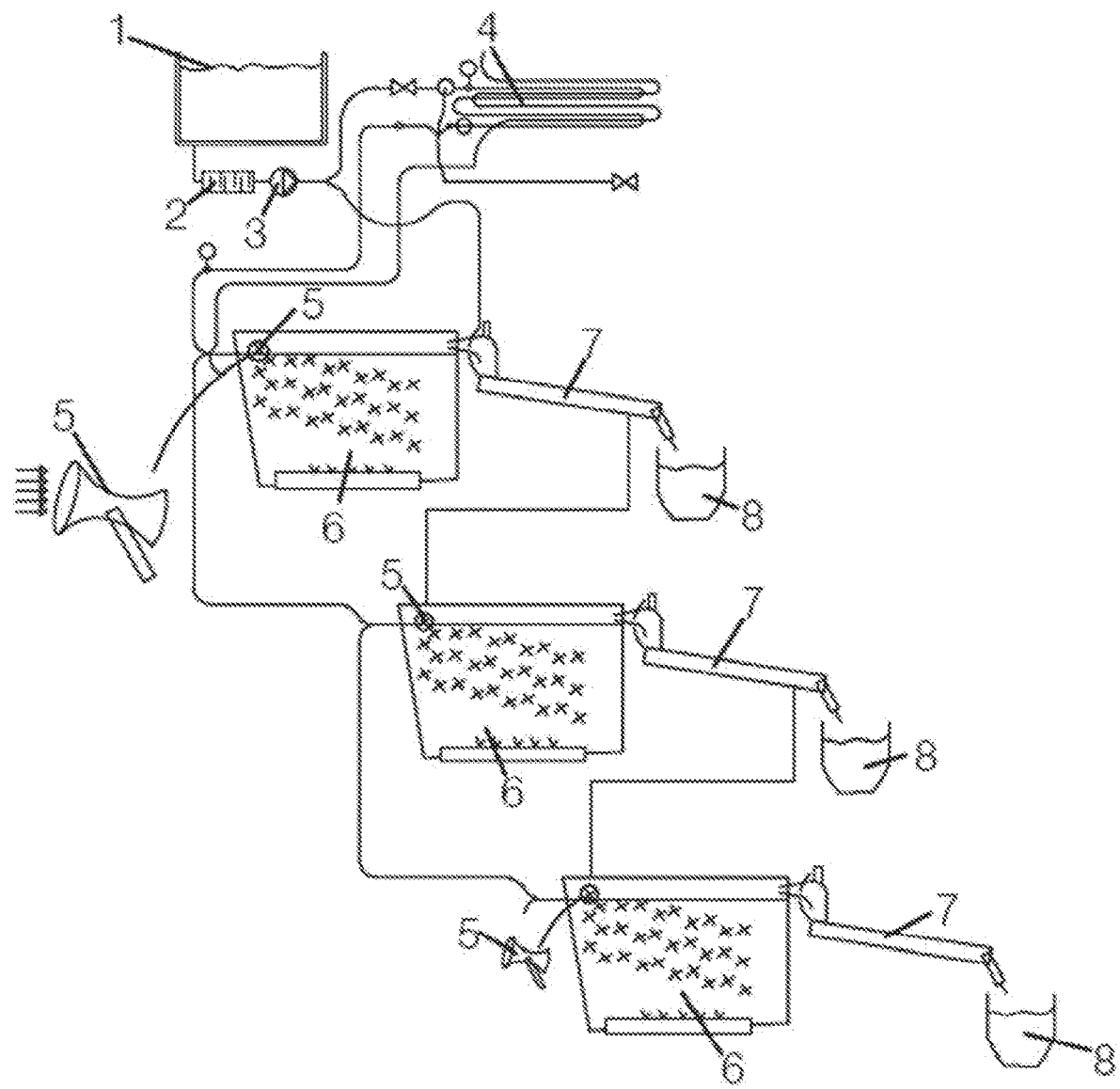

INSTALLATION AND METHOD FOR PURIFYING FLUIDS BY DISTILLATION

OBJECT OF THE INVENTION

The object of the present invention is a fluid purification system by distillation which separates solids diluted in the fluid by means of accelerating the fluid.

STATE OF THE ART

Up to date the most common methods of purifying water are mechanical methods and filters, such as described, for example, in P201130239. Herein, as an example it is provided a device and method of water purification that makes possible the water filtration, purification and distillation by a single device, using only sun energy (UV and IR radiation), also highlighting its portable and ergonomic characteristics, thus providing it with a capacity to be used anywhere and/or in any situation. Said device stands out mainly because it comprises a microporous bag containing a filtering material, such as activated charcoal, ultrathin resin or the like, for dirty water filtration, removing any microorganism, odor and color of such dirty water to obtain filtered water, and a container having on its surface an area provided with thermochromic paint adapted to indicate to the user the moment when the contained water is already purified through a change of the color of said thermochromic paint once water has reached a certain temperature during sun exposure.

In contrast, methods involving the use of membranes and vapor condensation are also used, such as in ES 2388882, wherein it is described a method for purification of a liquid by distillation by membrane comprising passing a stream of steamer retained liquid fraction heated through a retentive fraction channel along a porous hydrophobic membrane, whereby the liquid vapor flows through the pores of the membrane towards the other side of said membrane, and condensing said vapor in the other side of said membrane to produce a distillate stream in a channel of distillate, distillate created by passing the heat of the condensation (latent heat) towards a condenser surface, said surface forming a non-porous condenser separation between the liquid feeding stream of the liquid to be purified and said distillate stream, whereas the feeding stream is brought through a feeding channel in countercurrent with the retentive fraction stream and which feeding channel is connected hydraulically downstream with the retentive fraction stream, in which said feeding channel a spacer material is arranged, by which, at least a part of the latent heat is transferred via the condenser surface to the feeding stream, and whereby a positive differential pressure of the liquid is applied between the retentive fraction stream and the feeding stream at the respective points of the retentive fraction channel and the feeding channel, over a portion of each of the retentive fraction channel and the feeding channel.

DESCRIPTION OF THE INVENTION

Such as it has been reported, the object of the present invention is a method and a fluid purification plant by distillation that takes advantage of the fact that a fluid with solid components in solution at high temperature and high pressure is passed through a nozzle until it reaches a speed approaching the speed of sound.

The pressure of fluid passing through the nozzle lowers, reaching a state of depression that enables it to reach its vapor pressure at that temperature, this time point being when the solid components of the fluid in gaseous state are separated. Thus obtaining the solid components separated form the clean vapor that continues its way towards the condensation phase, where it liquefies already purified.

Therefore, the present invention uses a distillation system to separate diluted solids by accelerating to fluid speeds approaching the speed of sound. This implies that the fluid in liquid state, for example sea water, is purified in a completely physic way without any kind of chemical treatments and without a high energy consumption that, it can also be obtained through clean energies.

Throughout the description and claims, the word "comprise" and its variations are not intended to exclude other technical features, additives, components or steps. To those skilled in the art, other objects, advantages and features of the invention will arise partly from the description and partly from practice of the invention. The following examples and drawings are provided for illustrative purposes and they are not intended to restrict the present invention. Furthermore, the present invention embraces all possible combinations of particular and preferred embodiments set forth herein.

BRIEF DESCRIPTION OF DRAWINGS

In the following it will be described very briefly a series of drawings that will help to the better understanding of the invention and which are expressly related to an embodiment of said invention presented as a non-limiting example thereof.

FIG. 1 shows a block diagram of a purification plant according to one practical embodiment of the invention.

EXPLANATION OF A DETAILED EMBODIMENT OF THE INVENTION

A preferred embodiment of the invention suggests obtaining drinking water from non usable waters non suitable for human use. Thus, it is suggested a cleaning cycle based on the diluted solids separation by the kinetics of the biphasic mixture liquid-vapor. This will take into account the following:
 i. The temperature of the liquid has to be increased up to its boiling point under extreme conditions of pressure and temperature.
    a. Obtaining the required energy from any ecological system present in the nature surrounding the place where the purification plant is to be installed, i.e., wind energy, sun energy or any other kind of renewable energy and/or its associated low costs; and
    b. Performing heat exchange with a primary thermal fluid arranged as heat transfer to the system cycle.
 ii. Increasing the speed of the biphasic mixture vapor-liquid to speeds of around 450 m/s (Mach 0.85) to produce temperature variations up to 60° C. for a few milliseconds and instantly disintegrating the pure water from the salts therein.

The result of development gives rise to a process by which two products are obtained at the outlet:
 a) High purity clean water.
 b) Solid wastes (for example, with sea water, common salt).

FIG. 1 shows a purification plant object of the present invention embodiment. Thus, from a reservoir containing water non suitable for human use (1) the fluid goes through a first filter (2) for impurities and, by a pump (3) the fluid pressure and temperature are increased up to a temperature not higher than 25° C. The fluid then passes to a heat area (4) where the fluid is heated through a heat transfer fluid which will be at a temperature not higher than 275° C.

The heated fluid then passes to a convergent-divergent nozzle (5) accelerating the fluid to speeds approaching the speed of the sound (preferably, to about 450 m/s), performing an adiabatic compression-expansion of the biphasic liquid-vapor system.

Finally, in each of the solid reservoirs (6), the solids precipitate to the bottom, while the purified water is condensed in a condenser (7) to be stored in a purified fluid reservoir (8).

In the practical embodiment showed in FIG. 1 there are arranged several separation steps (5, 6, 7) which are fed again with different thermal gradient (difference between the fluid inlet and the outlet temperatures).

Numerically, in the plant shown in FIG. 1, for a mass flow rate of 30 l/min and a temperature gradient between the inlet and outlet of 32.3° C. with a fluid density 0.78 kg/dm$^3$ as well as a specific heat of 2510 J/Kg, it is obtained 3 l/min of purified water and 105 g of salt/min in case of sea water, yielding a thermal balance of 13.35 KW/l of obtained water.

The invention claimed is:

1. A fluid purification method by distillation comprising:
   i) providing a fluid containing solids from a reservoir;
   ii) filtering the fluid from the reservoir from step (i) through an impurities filter to obtain a filtered fluid;
   iii) increasing a fluid pressure and temperature up to a boiling point of the filtered fluid by using a pump;
   iv) passing the fluid from step iii) to a heating area to heat the fluid with a heat transfer fluid thereby obtaining a heated fluid;
   v) passing the heated fluid from step iv) through a convergent-divergent nozzle to accelerate the heated fluid to a speed of about 450 m/s, thereby causing an adiabatic compression-expansion of a biphasic liquid-vapor system, wherein suspended solids settle to a bottom of a solids reservoir; and
   v) condensing the vapor state fluid from the biphasic liquid-vapor system in a condenser to obtain a purified fluid.

2. The method according to claim 1, wherein the temperature of the heat transfer fluid not higher than 275° C.

3. The method according to claim 1, wherein the temperature increased by the pump in step iii) is not higher than 253° C.

4. A fluid purification plant by distillation, comprising:
   a reservoir with a fluid containing solids, provided with an impurities filter;
   a pump (3) connected to the reservoir downstream of the impurities filter and set up to increase a pressure and temperature of the fluid containing solids;
   a heating area for heating the fluid containing solids, comprising a plurality of ducts contacting heat transfer fluid;
   a convergent-divergent nozzle connected to an outlet from the heating area and configured to accelerate the heated fluid to about 450 m/s thereby causing an adiabatic compression-expansion of a biphasic liquid-vapor fluid;
   a solids reservoir where suspended solids precipitate;
   a condenser where purified fluid is condensed; and
   a purified fluid reservoir to collect purified fluid.

\* \* \* \* \*